(12) United States Patent
Stuhrmann et al.

(10) Patent No.: US 8,966,500 B2
(45) Date of Patent: Feb. 24, 2015

(54) LOCAL EVENT INFRASTRUCTURE

(75) Inventors: Joerg Stuhrmann, Hirschhorn (DE); Patrick Schmidt, Heidelberg (DE)

(73) Assignee: SAP SE, Walldorf (DE)

( * ) Notice: Subject to any disclaimer, the term of this patent is extended or adjusted under 35 U.S.C. 154(b) by 1548 days.

(21) Appl. No.: 11/849,143

(22) Filed: Aug. 31, 2007

(65) Prior Publication Data

US 2009/0063218 A1 Mar. 5, 2009

(51) Int. Cl.
*G06F 3/00* (2006.01)
*G06F 9/44* (2006.01)
*G06F 9/46* (2006.01)
*G06F 13/00* (2006.01)
*G06Q 10/06* (2012.01)

(52) U.S. Cl.
CPC .............. *G06Q 10/06* (2013.01); *G06Q 10/063* (2013.01)
USPC .......................................... 719/318; 719/313

(58) Field of Classification Search
None
See application file for complete search history.

(56) References Cited

U.S. PATENT DOCUMENTS

| | | | |
|---|---|---|---|
| 6,088,659 A * | 7/2000 | Kelley et al. | 702/62 |
| 7,500,249 B2 * | 3/2009 | Kampe et al. | 719/318 |
| 2006/0168591 A1 * | 7/2006 | Hunsinger et al. | 719/318 |
| 2007/0240046 A1 * | 10/2007 | Yan et al. | 715/700 |
| 2009/0037240 A1 * | 2/2009 | Schmidt et al. | 705/7 |
| 2009/0070784 A1 * | 3/2009 | Schmidt et al. | 719/318 |

* cited by examiner

*Primary Examiner* — Craig Dorais
(74) *Attorney, Agent, or Firm* — Mintz Levin Cohn Ferris Glovsky and Popeo, P.C.

(57) ABSTRACT

A local event infrastructure and method for detecting events of a business application. An event manager is configured to detect one or more events of the business application based on a number of predetermined conditions. An event filter is configured to filter the one or more events detected by the event manager according to a relevance to an operation of a business application system that contains the business application.

15 Claims, 4 Drawing Sheets

LOCAL EVENT INFRASTRUCTURE

BACKGROUND

This disclosure relates generally to computer-based mechanisms for monitoring activity of a business application, and more particularly to an infrastructure for collecting, prefiltering and publication of local events for intersystem usage in a distributed business application system.

Business activity monitoring (BAM) is technology to proactively define, monitor and analyze information that represents opportunities and risks in an enterprise to maximize profitability and optimize efficiency. The data can be generated from external as well as internal processes. BAM supports operational performance management, i.e. knowing and understanding the historical, current, and predictive context of business processes, as well as details of key performance indicators (KPIs) and associated business activities.

Effective implementation of BAM includes three general steps. First, relevant data is gathered in an efficient and timely manner and in sufficient quantities to provide meaningful results. Second, the data is processed to identify and categorize factors relevant to specific concerns. Finally, the data is analyzed and the results displayed in a clear, user-friendly interface so personnel can take appropriate actions.

Enterprise business applications, such as customer relationship management (CRM), supply chain management (SCM), enterprise resource planning (ERP), product lifestyle management (PLM), and other applications, utilize a number of inbound and outbound communication channels for integrated operation across a distributed, often heterogeneous application system landscape.

An effective BAM platform requires an event-driven architecture that seamlessly integrates and leverages functionalities of legacy and existing operational platforms. Further, the degree of sophistication of a BAM solution comes from its ability to process and analyze events for timely, accurate alerts and simple user interface functionality. Finally, Processing and analytical functions, which are at the core of business activity monitoring, ensure that critical business indicators are correctly monitored. Key issues include scope and scale. Scope involves the types of rules that the solution supports, as well as the ability to obtain and maintain historical context. Scale entails the need for processing and analysis to produce results within a timely window after significant incidents occur.

FIG. 1 illustrates a use case for BAM, in which a BAM "listener" process 100 receives information about local events 102 that occur within model driven application components of a business suite of applications 104. Each component of the business suite of applications 104 operates on one or more business objects 106 which produce exposed business object services 108 for use by an end user or other component. Local events 102 must be communicated via synchronous and asynchronous communication channels 110 to the BAM listener process 100.

Unfortunately, communication capabilities of present systems are insufficient to adequately collect, filter, and publish events being generated in some components of a business application, and in particular existing systems and legacy components of the business application. For example, asynchronous services need to communicate their completion once consumed, but such communications are difficult to execute and manage from a global application perspective. There needs to be a common mechanism to signal an object state change to an instance, and which decides whether a monitoring event needs to be created.

Further, event resolution in a basic sense means that an application detects invalid business data or some deadline reached and fires an alert. This alert will be used by a Event Resolution Framework (or Event Resolution Center) that generates a resolution to the invalid data. Thus, the application alone must be able to detect the inconsistent, incorrect state of the application data. In most cases, the application is not able to detect inconsistencies, because the application may need additional data from other systems or because one monitoring event alone does not lead to an alert that can be visualized to an end-user.

SUMMARY

Disclosed are systems and methods for local event monitoring for a business activity monitoring platform. The system and method provide a common mechanism to signal an object state change within an instance of an application or application component, and that decides whether a monitoring event needs to be created.

In one aspect, a local event infrastructure for detecting events of a business application includes an event manager to detect one or more events of the business application based on a number of predetermined conditions, and an event filter to filter the one or more events detected by the event manager according to a relevance to an operation of a business application system that contains the business application.

In another aspect, an application system includes a business application configured to execute one or more business processes on a computing system, and a condition storage that contains one or more conditions that are imposed on the business application by a condition runtime engine. The application system further includes an event manager to detect one or more events of the business application based the one or more conditions, and an event filter to filter the one or more events detected by the event manager according to a relevance based on the one or more conditions.

In yet another aspect, a method of monitoring activity of a business application includes steps of defining an event signature for an event related to the business application based on one or more conditions, storing the event signature in an enterprise services repository associated with an enterprise that executes the business application. The method further includes the step of generating an outbound message proxy for the event according to the defined event signature.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

DETAILED DESCRIPTION

This document describes a local event infrastructure that is embedded within components of a business application or application suite, to collect, filter and publish events occurring within an application system component of the business application. The events can be used by an intersystem business activity monitoring system for analysis and processing to more intelligently and efficiently manage the business application and generate event resolutions. Such enhanced event resolution capabilities enriches the scenario of Event Resolution Framework with stateful processes and correlation of monitoring events.

A monitoring process collects events raised by diverse sources and deduces action items to be completed by business experts. Monitoring processes are predefined using an Integration Builder (IB) tool or the like, and work items are created as a consequence of process execution. BAM also introduces the concept of a monitoring event. A monitoring event is a notification in the form of a exchange infrastructure (XI) message sent to the monitoring process about a significant state change in the business application system. BAM enriches the scenario of event resolution with stateful processes and correlation of monitoring events.

An application can discharge monitoring events using message communication, and therefore a monitoring event also represents a message interface that refers to message type, etc. Each already existing message communication can be used to supply monitoring processes with information. Additional monitoring events are necessary when no message communication exists already.

As described above, a monitoring process collects events raised by diverse sources such as an application system or component of a business suite, and deduces action items to be completed by business experts. The monitoring processes are predefined using an Integration Builder (IB) tool or the like, and work items are created as a consequence of process execution. Monitoring processes can also represent the so-called "end-to-end" business processes to show milestones.

A monitoring event is a notification sent to the monitoring process about a significant state change in the application system or component. In preferred implementations, the transport medium of monitoring events are messages, and the transport mechanism is a messaging infrastructure.

An application can discharge monitoring events using message communication, and therefore a monitoring event also represents a message interface that refers to message type, etc. Each already existing message communication can be used to supply monitoring processes with information. Additional monitoring events are necessary when no message communication already exists. Workflow events can be used to enable application systems to fire monitoring events to eventually produce an event resolution.

Figure 1:
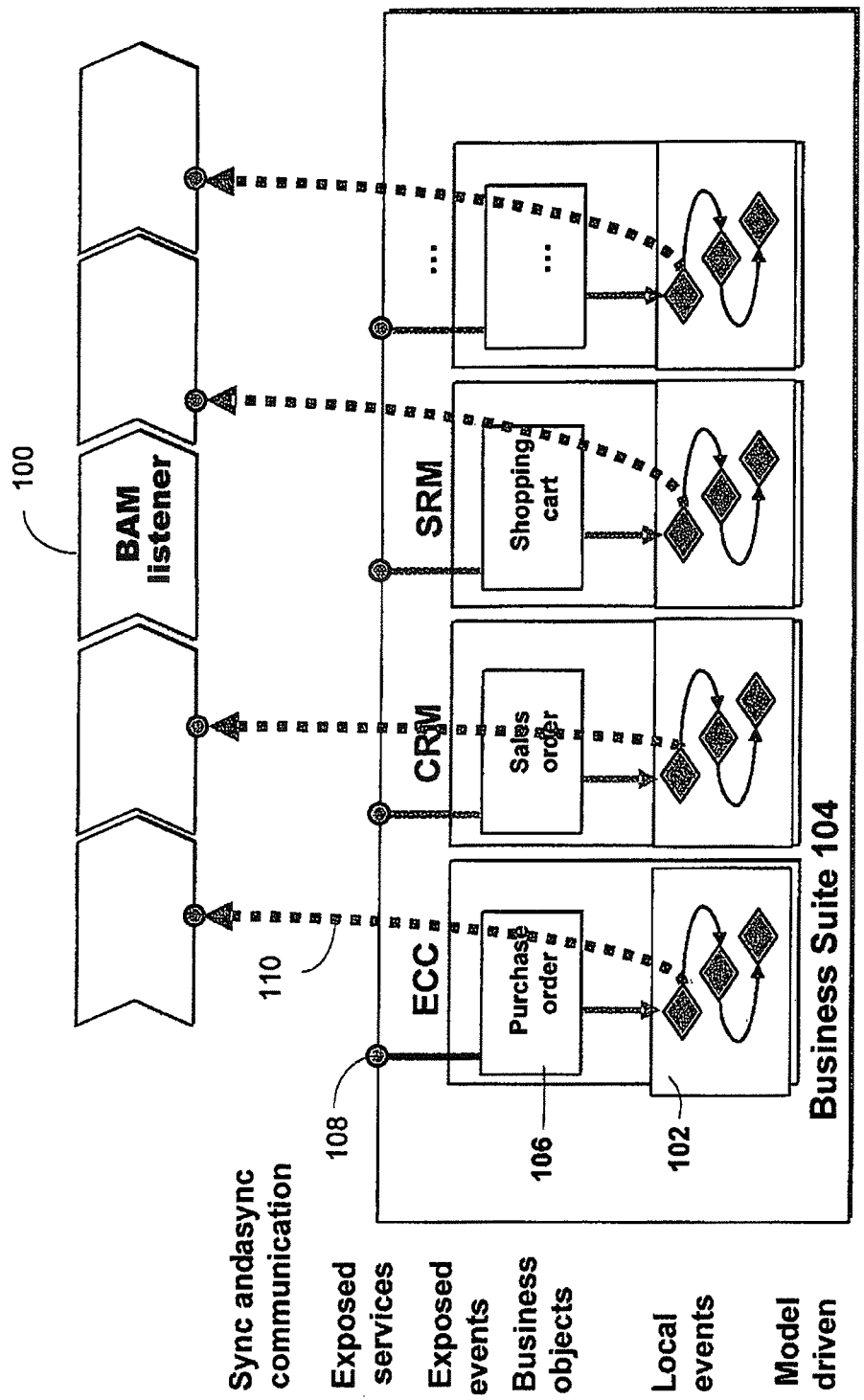
FIG. 1 illustrates a business activity monitoring scheme.
Figure 2:
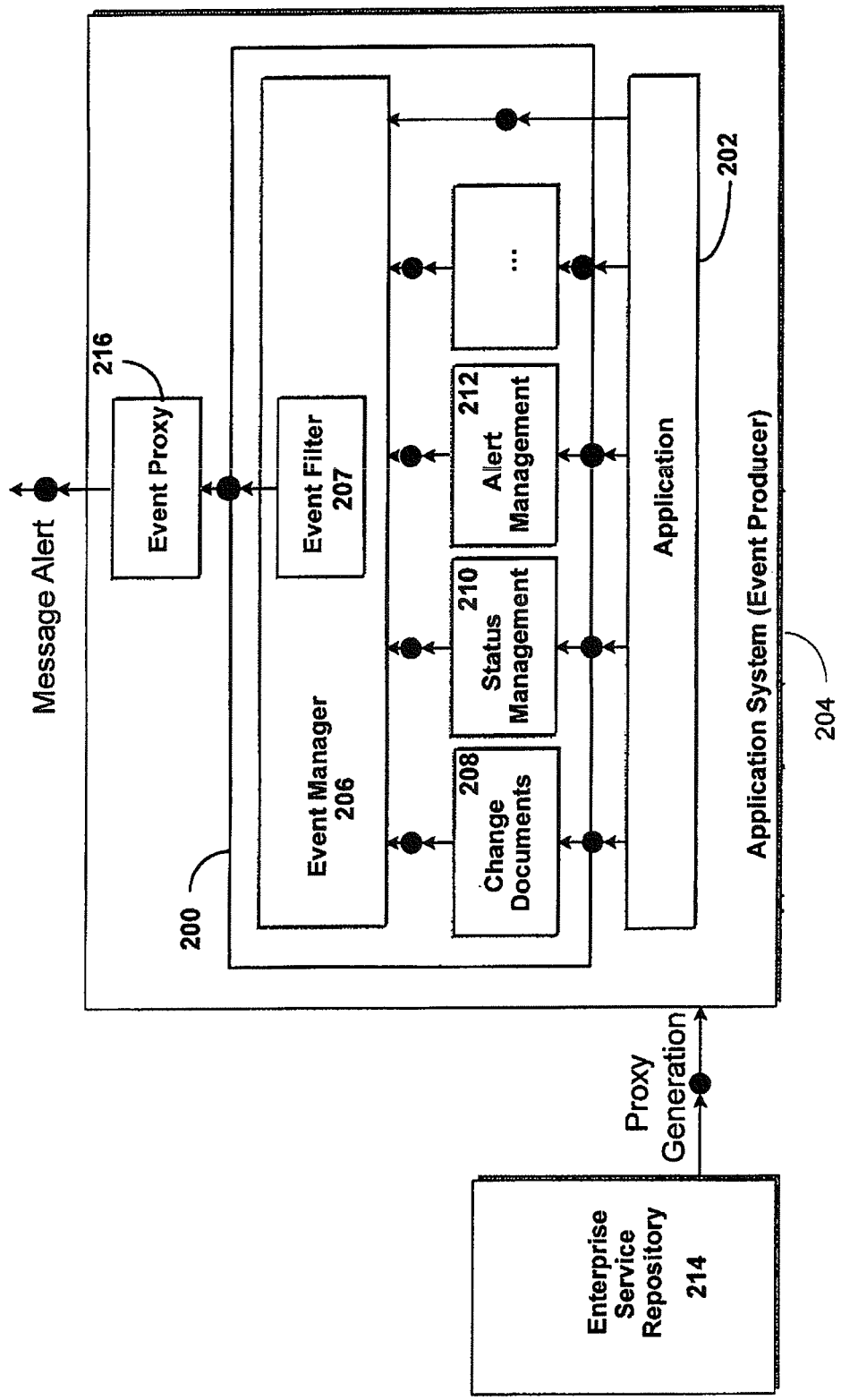
FIG. 2 is a block diagram of a local event infrastructure.

FIG. 2 is a functional block diagram of a local event infrastructure 200 that is embedded with an application 202 as part of an application system 204. The application system 204 can be any event producer, i.e. an instance of an application or application component of a business application suite that generates business object state changes on which workflow events can be created.

Workflow events are mechanisms to add actions upon business object state changes without modification to the application instance. Such state changes occur in an instance of the application 202, and the workflow events are converted into monitoring events by the local event infrastructure 200 for a BAM system. Workflow events result in a proxy call in the local application system 204. The workflow event data is sent by an event proxy 216 to a monitoring process instance of the BAM system. Workflow events are created all over the system directly, or indirectly via 'generic event enablers' such as business transaction events, a message control (NAST) system, a Post Processing Framework (PPF), Change Documents, a Logistics Information System, change of personnel data, etc.

The local event infrastructure 200 includes an event manager 206 to receive messages that represent the workflow events of the local application 202. The event manager 200 includes an event filter 207 to filter the workflow events for only relevant or significant workflow events based on conditions established in a IB tool for the BAM system. The local event infrastructure 200 further includes a change documents module 208, a status management module 210, and an alert management module 212.

In accordance with monitoring event creation and filtering by the local event infrastructure 200, local workflow events are converted to global events as follows: event signatures are defined in an enterprise service repository 214, and for each defined event, a local outbound event proxy 216 is generated for the application system 204. The outbound event proxy 216 is adapted to cast local workflow events to an outbound proxy call, configured as a message or an alert.

Figure 3:
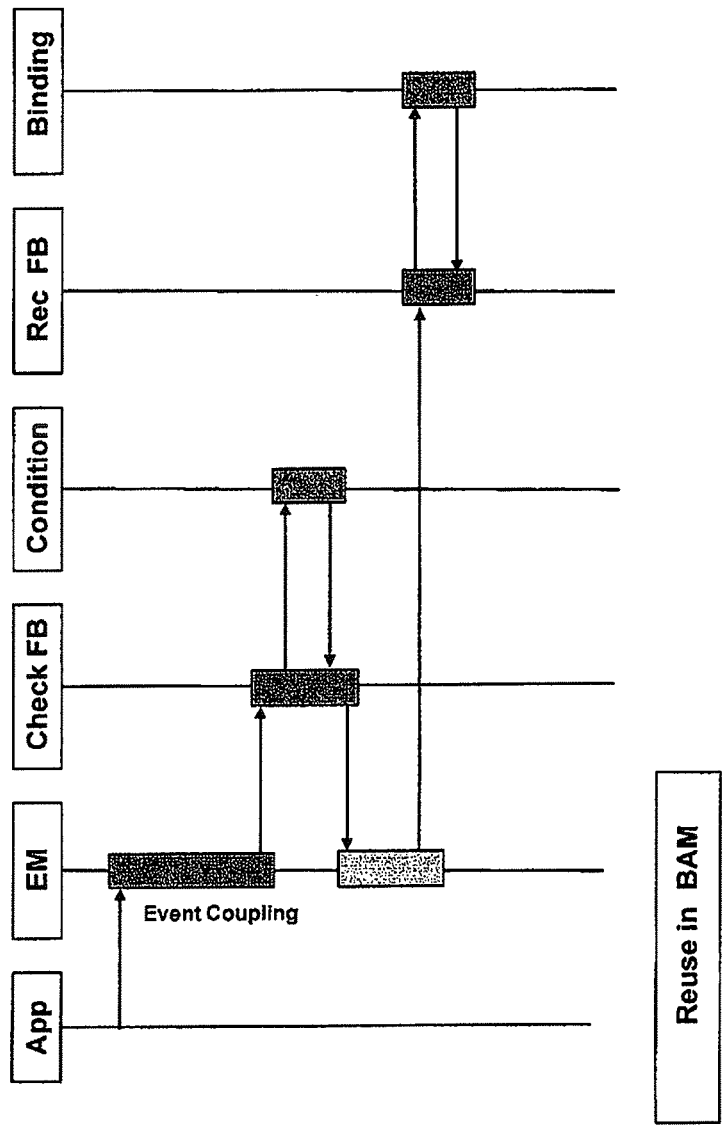
FIG. 3 shows a workflow event execution sequence of an event manager.

With reference also to FIG. 3, the workflow event execution sequence is as follows: the event manager 206 receives the event. A predefined check (function) module may check the relevance of the event (generic using workflow conditions), the receiver (function) module executes required actions after having received the event data via binding. The event manager and the other components shown are reused from the workflow infrastructure as summarized in the following table:

| Reuse Component | Purpose |
| --- | --- |
| Event Coupling Table | Defines relation between Event and Proxy |
| Check (function) module | Defines generic (function) module for Filtering |
| Receiver (function) module | Defines generic (function) module for communication (proxy execution) |
| Condition | Filters Conditions |
| Binding | Supply data to from Workflow Event to Proxy |

Maintenance of the tables of the local event infrastructure is only possible on the application system itself, since only there are the business objects and events known. Also defining the data binding to supply the event data to the monitoring event (message) needs also to be done on the application system 204, because only there, both the workflow Event and the Monitoring Event is known.

Not all business object state changes are relevant for event resolution in the BAM system, and a decision whether or not a monitoring event needs to be created is made. This decision can be evaluated locally in the application system, before the monitoring events is transmitted via external communication, to minimize external communication and to provide all application data as decision base for the condition that decides whether the event is event resolution relevant or not.

The event filter 207 performs filtering using a "start condition" that runs on business objects to reduce the delivered events. Alternatively, check-functions allow stopping an event upon an application decision. Each application can create a check-function for each case or use the more generic start conditions. Start conditions are preferably only used for workflow start, but could be adapted to check all kinds of events. These conditions are maintained locally in the application system. Event coupling and condition definition should be done locally in the application system 204 to access the object attributes and available events. In addition, some applications need customizing steps to enable firing events.

Figure 4:
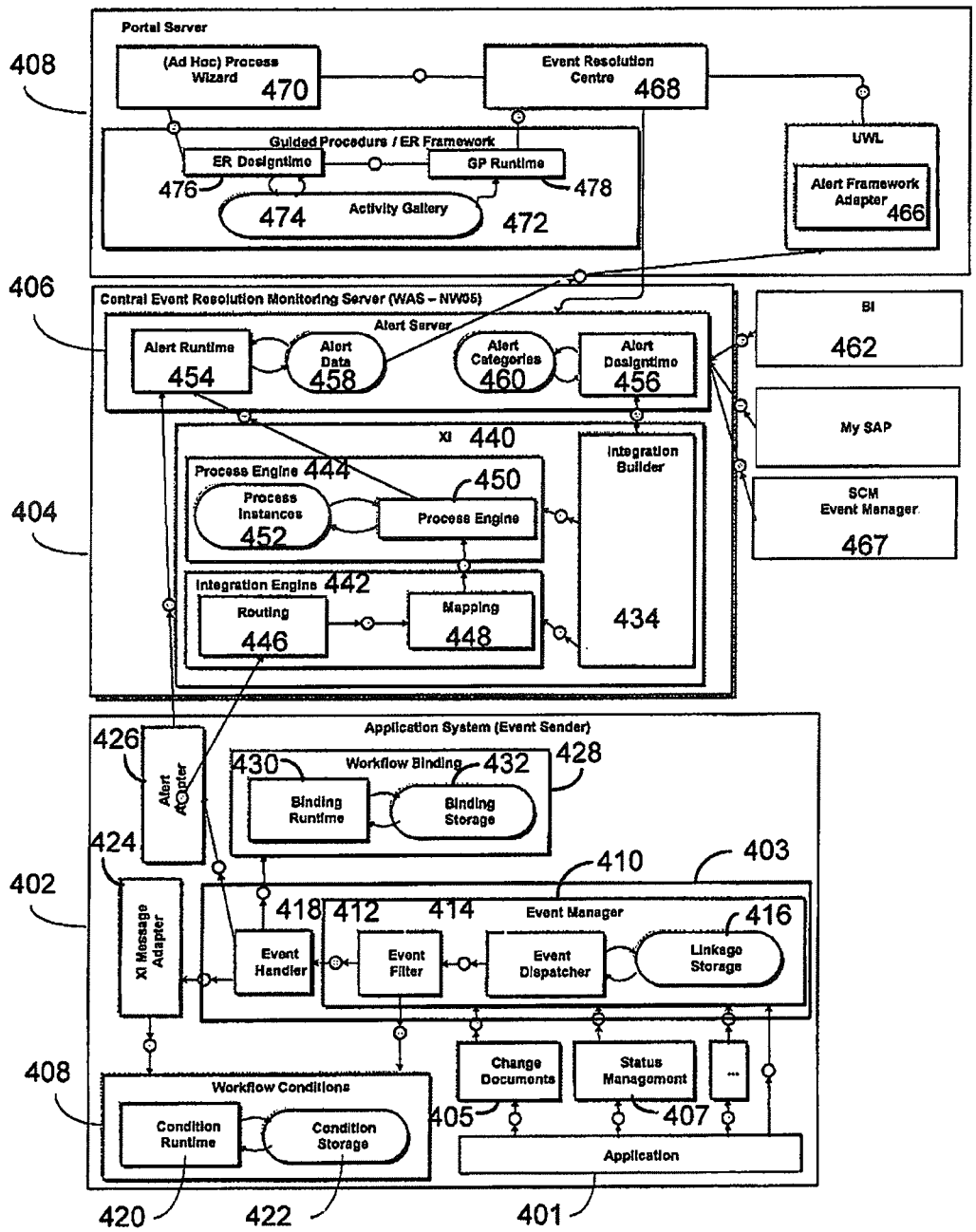
FIG. 4 is a block diagram of a business application system.
Like reference symbols in the various drawings indicate like elements.

In accordance with an alternative exemplary embodiment, FIG. 4 illustrates a business application system 400 that detects relevant business issues from one or more business applications 401. The business application system 400 monitors the relevant business issues across the business application system 400, alerts responsible users, and supports the resolution of the business issues. A business issue can be an error in the runtime of a business application 401, an integration problem among two or more business applications 401 or systems, or other problem that affects the proper functioning of the business applications 401. The business application system 400 includes an application system 402, a central event resolution monitoring server 404 including an alert server 406, and a portal server.

Detecting business issues is performed by a local event infrastructure 403 as a part of the application system 402. The local event infrastructure 403 includes an event manager 410 to manage detection of events and mapping the events to exchange infrastructure (XI) messages. The event manager 410 includes an event dispatcher 414 that interprets linkage tables in a linkage storage 416 between events of an application 401 and an event consumer, such as a BAM system. The events are detected by the event manager from a change documents module 405, an application status management module 407, or other module that can generate a message representing a state change of an instance of an application 401 process.

The event manager 410 further includes an event filter 412 that filters events based on conditions, thresholds, parameters, etc., and checks the relevance of the events, based on workflow conditions 408. The event filter 412 then executes an event handler 418 for relevant events. The workflow conditions 408 includes a condition storage 422 that stores one or more conditions of a workflow of the application 401, and which are executed and evaluated by a condition runtime engine 420. As will be discussed below, the conditions can be established via modeling tool such as an integration builder 434.

The event handler 418 translates relevant events into a monitoring event based at least in part on a workflow binding module 428. The workflow binding module 428 includes a binding storage 432 and a binding runtime engine 430 that executes a binding function. The event handler 418 also prepares an alert for the monitoring event via an alert adapter 426.

As discussed above, the integration builder 434 is used to define the monitoring events, monitoring processes, process-relevant alert categories, mappings, etc., and to configure each monitoring process. To streamline the setup of the local event infrastructure 403, settings will be made centrally to the greatest extent possible. The integration builder 434 is part of the XI 440. The XI 440 also includes a integration engine 442 and a process engine 444. The integration engine 442 includes a routing module 446 to route XI message-configured monitoring events to the desired message recipient, i.e. the alert server 406. The integration engine 442 also includes a mapping module 448 to map monitoring events to monitoring processes. The monitoring processes are executed by a process engine 450 that is controlled by the integration builder 434, and which generates and runs process instances 452.

The alert server 406 is configured to manage and link alert categories to users. The alert server 406 includes an alert design time module 456 that generates and stores the alert categories 460. The alert server 406 further includes an alert runtime 454 that generates and stores alert data 458 based on messages received either from the process engine 450 or from the alert adapter 426 in the application system 402. Alerts needing or requiring resolution are sent in the form of alert data to an alert framework adapter for resolution in the portal server 408.

Several components can have access to or supply information to the alert server 406. The alert server 406 may be connected with a business intelligence (BI) system 462. BI is adapted to configure key performance indicators for the business application system 400. A role-based set of application tools, such as a MySAP suite of application tools 464, can be used by the alert server 406. Finally, an application-specific event manager 467 can be used to manage events as indicated by the alert server 406.

The portal server 408 provides a portal that includes an event resolution center 468, a graphical user interface in which a user can resolve issues for which alerts have been generated and for which monitoring events and monitoring processes have been created. The event resolution center 468 can be connected to a process wizard 470, which can logically, and in an ad-hoc manner, walk a user through steps to resolve or fix the issue, and can track user actions in such resolutions.

The process wizard 470 and event resolution center 468 use a guided procedures/event resolution framework 472. This framework 472 includes an activity gallery 474 of possible activities that can be undertaken by a user of the portal server. The activities in the activity gallery 474 are used by an event resolution design time module 476, which creates templates of possible resolutions to issues. The activities are also used by a guided procedure runtime module 478 which executes guided procedures for the event resolution center 468. The event resolution design time module 476 can also save new activities to the activity gallery 474 based on feedback from the process wizard 470 for dynamic, self-learning and future use.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A local event infrastructure for detecting events of a business application, the local event infrastructure comprising:
    an event manager, implemented by one or more processors, to detect one or more events of the business application based on a number of predetermined conditions associated with a state change of one of a plurality of business objects that comprise a workflow of the business application;
    an event filter, implemented by one or more processors, to filter the one or more events detected by the event manager according to a relevance of one or more of the number of predetermined conditions to an operation of a business application system that contains the business application;
    an event proxy, implemented by one or more processors, that receives an indication of a relevant event after the relevant event is detected by the event manager and filtered as relevant by the event filter, the event proxy casting the relevant event into an outbound proxy call configured as a message for a monitoring process instance of a business application monitoring system; and
    an event dispatcher, implemented by one or more processors, that interprets links between events of the business application and an event consumer, the links being represented in linkage tables stored in a linkage storage.

2. A local event infrastructure in accordance with claim 1, further comprising a change documents module, implemented by one or more processors, that detects a state change in a process of the business application and triggers the event manager to detect the state change.

3. A local event infrastructure in accordance with claim 1, further comprising a status management module, implemented by one or more processors, that detects a state change in a status of the business application and triggers the event manager to detect the state change.

4. A local event infrastructure in accordance with claim 1, further comprising an alert management module, implemented by one or more processors, that detects an alert generated by the business application and triggers the event manager to detect the alert.

5. A local event infrastructure in accordance with claim 1, wherein the event proxy includes an event handler to generate a workflow event message that is heterogeneously compliant with components of the business application system.

6. An application system comprising:
a business application configured to execute one or more business processes on a computing system;
a condition storage that contains one or more conditions that are imposed on the business application by a condition runtime engine, the one or more conditions being associated with a state change of one of a plurality of business objects that comprise a workflow of the business application;
an event manager, implemented by one or more processors, to detect one or more events of the business application based the one or more conditions;
an event filter, implemented by one or more processors, to filter the one or more events detected by the event manager according to a relevance of the one or more conditions to an operation of a business application system that contains the business application;
an event dispatcher, implemented by one or more processors, that interprets links between events of the business application and an event consumer, the links being represented in linkage tables stored in a linkage storage; and
an alert adapter, implemented by one or more processors, configured to cast events from the event handler into an alert for transmission to an alert server after the event is detected by the event manager and filtered as relevant by the event filter, the alert for transmission including an outbound proxy call configured as a message for a monitoring process instance.

7. An application system in accordance with claim 6, further comprising a change documents module, implemented by one or more processors, that detects a state change in a process of the business application and triggers the event manager to detect the state change in the process.

8. An application system in accordance with claim 7, further comprising a status management module, implemented by one or more processors, that detects a state change in a status of the business application and triggers the event manager to detect the state change in the status.

9. An application system in accordance with claim 8, further comprising an alert management module, implemented by one or more processors, that detects an alert generated by the business application and triggers the event manager to detect the alert.

10. An application system in accordance with claim 6, further comprising a binding runtime engine, implemented by one or more processors, to bind events to workflows of the business application.

11. An application system in accordance with claim 6, further comprising a message adapter, implemented by one or more processors, configured to translate events from the event handler into a message for transmission to the event consumer.

12. An application system in accordance with claim 11, wherein the event handler includes a central event monitoring server hosting an alert server, the alert server responsive to alerts generated by an alert adapter that is configured to translate events from the event handler into an alert.

13. A method of monitoring activity of a business application, the method comprising:
defining an event signature for an event related to the business application based on one or more conditions associated with a state change of one of a plurality of business objects that comprise a workflow of the business application;
storing the event signature in an enterprise services repository associated with an enterprise that executes the business application;
detecting a local event within the business application;
comparing the local event with the event signature;
filtering the detected local event based on a relevance according to the one or more conditions;
interpreting links between events of the business application and an event consumer, the links being represented in linkage tables stored in a linkage storage; and
generating, by the enterprise services repository, an outbound message proxy for the event according to the defined event signature, after the event is detected and filtered as relevant, the outbound message proxy casting the event as an outbound proxy call configured as a message for a monitoring process instance of a business application monitoring system.

14. A method in accordance with claim 13, further comprising casting the local event as an outbound message proxy call if the local event corresponds with the event signature.

15. A method in accordance with claim 14, further comprising transmitting the outbound message proxy call by the outbound message proxy to the event consumer associated with the business application monitoring system.

* * * * *